United States Patent Office 3,781,307
Patented Dec. 25, 1973

3,781,307
RUTHENIUM CATALYZED PROCESS FOR THE ALKYLATION OF KETONES
Pierre Chabardes and Yvon Querou, Lyon, France, assignors to Rhone-Poulenc S.A., Paris, France
No Drawing. Filed Aug. 11, 1969, Ser. No. 849,162
Claims priority, application France, Aug. 12, 1969; 162,770
Int. Cl. C07c 49/06; C07d 5/16
U.S. Cl. 260—347.8                                       11 Claims

ABSTRACT OF THE DISCLOSURE

Primary alcohols condense with ketones containing at least one alpha hydrogen atom in the presence of a basic compound and a catalyst based on a noble metal of Group VIII of the Periodic Table to give higher ketones.

---

U.S. Pat. 2,064,254 describes the preparation of so-called higher ketones by condensation of lower ketones with aliphatic alcohols at temperatures between 150 and 400° C. in the presence of catalysts containing active components for hydrogenation and active components for dehydration.

A similar process has also been described by Ipatieff et al. [J. Org. Chem. 7 189–98 (1942)]. The catalysts used are those which are simultaneously active for dehydrogenation and for dehydration (copper-alumina and copper-zinc oxide alumina). The alcohols used are primary and secondary alcohols. In the case of the primary alcohols it is necessary to work at temperatures of the order of 300 to 350° C.

U.S. Pat. No. 2,725,400 describes the condensation of an alcohol with a ketone at temperatures between 240° C. and 300° C. and at pressures exceeding 12.3 kg./cm.$^2$ (175 p.s.i.g.) in order to increase the degree of conversion. The catalyst used is based on copper and alumina. The alcohol may be primary, secondary or tertiary.

In U.S. Pat. 2,697,730 the condensation of an alcohol with a ketone is carried out in the vapour phase in two stages. In a first stage, the alcohol and the ketone are reacted at between 240 and 300° C. under a pressure exceeding 12.3 kg./cm.$^2$ (175 p.s.i.g.) and in the presence of a mixed dehydrogenation and dehydration catalyst. In a second stage the gaseous reaction mixture coming from the first stage of the reaction is passed over a dehydrogenation catalyst at a temperature exceeding 225° C. and under a pressure of between 1.05 kg./cm.$^2$ (15 p.s.i.g.) and 3.5 kg./cm.$^2$ (50 p.s.i.g.).

The present invention provides a process whereby ketones may be condensed with primary alcohols at relatively low temperatures and pressures.

The process of the present invention for the preparation of ketones of the formula:

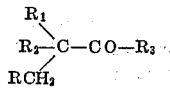

in which R is a hydrogen atom or a monovalent organic radical of which the free valency is attached to a carbon atom, R$_1$, R$_2$ and R$_3$, which may be identical or different, are monovalent organic radicals of which the free valency is attached to a carbon atom and which may be linked together, and R$_1$ and R$_2$ can furthermore be hydrogen atoms, comprises reacting a primary alcohol of formula R—CH$_2$OH with a ketone of formula R$_1$R$_2$HC—CO—R$_3$ in the presence of a basic compound and of a catalyst based on a noble metal of Group VIII of the Periodic Table.

By way of illustration, the radical R of the primary alcohol R—CH$_2$OH may be a hydrogen atom, or an aliphatic, alicyclic, aromatic or araliphatic hydrocarbon radical which may or may not be branched, which may be saturated or unsaturated, and which may furthermore be interrupted by hetero-atoms such as O, N, S or P or by functional groups such as for example —CO—O—, —CO—NH— or —CO—. This radical R may contain up to 30 carbon atoms and may contain the most diverse substituents such as for example halogen atoms or hydroxyl, alkoxy, carboxyl, carboxylate, sulphonic, sulphonate, nitro, nitroso or amino groups. Preferably R is hydrogen, an aliphatic hydrocarbon radical of up to 10 carbon atoms, which is saturated or contains one or two ethylenic double bonds, phenylalkyl of up to 5 carbon atoms in the alkyl residue, which is unsubstituted or substituted by alkoxy of up to 5 carbon atoms, or furfuryl. A class of alcohols which leads to very particularly valuable results in the process of the invention consists of the primary alcohols which in the α-position to the group CH$_2$OH contain an aromatic unsaturation. Suitable alcohols of formula R—CH$_2$OH include especially ethanol, propanol, butanol, isobutanol, pentanol, decanol, 3,7-dimethyl-octanol-1, methoxyethanol, ethoxyethanol, allyl, methallyl, 3-phenyl-allyl, crotyl, isocrotyl, benzyl, furfuryl, anisyl and β-phenyl-ethyl alcohols, 3-methyl-2-butenol-1, 3-methyl-3-butenol-1, 3-hexenol-1, 2,6-nonadi-enol-1, 1-methyl-3-isopropenyl-2-methylol-cyclopentene-1, o-, m- and p-hydroxybenzyl alcohols, perillyl, cuminyl, vannillyl, piperonyl and coniferyl alcohols, farnesol, nerol, citronellol, lavandulol, myrtenol, the santalols, geraniol, and the cyclogeraniols.

By way of illustration, the radicals R$_1$, R$_2$ and R$_3$ of the ketone R$_3$—CO—CHR$_1$R$_2$ may be aliphatic, alicyclic, aromatic or araliphatic hydrocarbon radicals (and R$_1$ and R$_2$ may furthermore represent hydrogen atoms). Such radicals may or may not be branched, and may be saturated or unsaturated and interrupted by hetero-atoms such as O, N, S and P and by functional groups such as for example —CO—, —CO—O— and —CO—NH—. Furthermore, two of the radicals R$_1$, R$_2$ and R$_3$ may optionally join to give a divalent radical. They may also contain substituents such as for example halogen atoms or alkoxy, carboxyl, carboxylate, sulphonic, sulphonate, nitro, nitroso or amino groups. R$_1$, R$_2$ and R$_3$ may contain in total up to 30 carbon atoms. Preferably R$_1$, R$_2$, and R$_3$ are each alkyl of up to 5 carbon atoms, or phenyl, and R$_1$ and R$_2$ can also be hydrogen, and R$_1$ and R$_3$ together can make up a trimethylene or tetramethylene chain. Suitable starting ketones include especially acetone, butanone (methyl ethyl ketone), butenone, pentanone-2, and pentanone-3, methyl isobutyl ketone, methyl isopropyl ketone, methyl tertiary butyl ketone, methyl benzyl ketone, the methylheptenones and dimethylheptenones, propyl isopropyl ketone, methyl amyl ketone, methyl hexyl ketone, mesityl oxide, homomesityl oxide, camphor, cyclopentanone, cyclohexanone, 2,2,6-trimethyl-cyclohexanone-1, cycloheptanone, cyclooctanone, cyclodecanone, cyclododecanone, 2,3-butanedione, acetyl-acetone, ethyl acetylacetate, acetophenone, p-methylacetophenone and p-methoxyacetophenone, o-hydroxyacetophenone, phenylacetone and p-methoxyphenylacetone, naphthyl methyl ketone, benzylidene-acetone, the ionones and methylionones and their derivatives obtained by hydrogenation or semi-hydrogenation of the olefinic double bonds, the irones, isophorone, tagetone, pulegone and isopulegone, carvotanacetone, carvone, dihydrocarvone, carvenone, cryptone, menthone and carvomenthone, muscone, exaltone, civettone and dihydrocivettone, myrcenone, ocimenone, the santolinenones, fenchone and isofenchone, pinocamphone, turmerone, curcumone, eremophilone, cyperone, vetivone and jasmone.

As the basic compound employed in the process of the invention, both inorganic and organic strong bases are principally used, and more particularly the alkali or alkaline-earth alcoholates, the alkali or alkaline-earth hydroxides or quaternary ammonium hydroxides, the oxides of alkali or alkaline-earth metals, and primary, secondary or tertiary amines. The basic compound can also be prepared in situ: in the presence of water or alcohol, the alkali or alkaline-earth metals form hydroxides or alcoholates respectively. The amount of basic compound expressed in mols relative to the alcohol R—CH$_2$OH used is generally 0.1 to 50%, preferably 5 to 20%.

The relative amounts of ketone and primary alcohol may vary within wide limits; an excess of one of these reagents may be used as a solvent. It is generally advantageous to carry out the process with a molar ratio of ketone/alcohol between 1:10 and 20:1.

The essential part of the catalyst used in the present invention is the noble metal of Group VIII which it contains. Any other part of the catalyst, whether chemically combined with the noble metal or not, is thus unimportant. Thus, the catalysts which are used in the process of the invention are noble metals of Group VIII of the Periodic Table or any of their inorganic or organic derivatives, for example, halides, chalkogenides, halogenochalkogenides, thiocyanates, salts of inorganic oxygen-containing acids such as the sulphates, nitrates and nitrites, and the salts of aliphatic, cycloaliphatic or aromatic organic acids such as the acetates, oxalates, stearates and naphthenates. The alcoholates and the phenates can also be used. The following inorganic or organic compounds are also suitable: alkali and alkaline-earth iridates, osmiates, platinates and ruthenates, the mixed salts derived from noble metals of Group VIII and an alkali metal, such as the ammonium, sodium or potassium halogenometallates, chloroplatinates or chlorosmiates; the mixed molybdates, halogenoxalates and chalcogenoxalates of alkali metals and noble metals of Group VIII; the halogenated and nitrosylated or aminated derivatives such as nitrosochlororuthenium, trichlororutheniumhexammine, and the chlorides of rhodiumdichlorotetrammine. Chelates are also suitable, such as the acetylacetonates which are optionally substituted by, for example, aliphatic or cycloaliphatic groups or by halogen atoms, the benzoylacetonates, the glyoximates, quinolinates, salicylaldehydates, benzylhydroxamates, the derivatives of ethylene diamine, of $\alpha,\alpha'$-dipyridyl, of o-nitrosophenol, of $\beta$-nitrosonaphthol, of salicylaldimidine, of naphtholdimidine and of the porphyrins.

Another class of catalyst which is particularly suitable consists of the complexes which the metals or derivatives of noble metals of Group VIII form with electron donors. The halogen, carbonyl or nitrosyl derivatives and the chelates, such as those mentioned above, are metal derivatives which can be used for the preparation of these complexes. As electron donors, substances with free pairs of electrons or capable of forming structures with free pairs of electrons and thus also able to act as electron donors are used. Thus carbon monoxide, monoolefins, diolefins, polyolefins, acetylene compounds, ammonia, cyanides, tertiary nitrogen-containing bases, phosphines, arsines, stibines, nitriles and the donors specifically quoted in French Pat. 1,337,558 are suitable as electron donors. Suitable olefins are especially butadiene, isoprene, cyclooctadiene and activated olefins such as acrolein, methacrolein and acrylamide. Suitable nitriles are especially saturated or unsaturated aliphatic, cycloaliphatic or aromatic nitriles such as acetonitrile, propionitrile, acrylonitrile, cyanocyclohexane, benzonitrile, toluonitrile, saturated or unsaturated dinitriles such as malononitrile, succinonitrile, adiponitrile, the dicyanobutanes and the dicyanobutenes, and aliphatic or aromatic isonitriles. Thus it is possible to use the complexes produced by reaction of compounds of noble metals of Group VIII, in particular the halides, the hydrohalides and the acetylacetonates, with the electron donors quoted above. The metal alkyls can also be used; the metallic derivatives described in U.S. Pat. No. 3,449,387 and Belgian Pat. No. 712,675 (corresponding to United States application Ser. No. 714,010, filed March 18, 1968 now U.S. Pat 3,647,832) are also suitable.

Because of the ready accessibility it is generally convenient to use as the catalyst a halide, carboxylic acid salt or complex of a said noble metal with an electron donor selected from 1,3-diketones, carbon monoxide, nitriles, amines, phosphines, and olefins. Particularly good results are obtained in the process according to the invention if a ruthenium derivative, especially the acetylacetonate is used as the catalyst.

The amount of catalyst employed is generally above 0.0001%, and preferably 0.01 to 5%, by weight of metal in relation, to the weight of alcohol R—CH$_2$OH. It is possible to use amounts of catalyst above 5% but this is generally of no economic value.

The reaction temperature is usually 30° C. to 300° C., preferably 50° C. to 200° C. Particularly valuable results are obtained working at 70° to 180° C. If the desired temperature exceeds the boiling point of the reaction medium, the reaction may be carried out in a closed vessel, generally under autogenous pressure. This pressure is usually less than 50 bars. The process can be carried out either in a liquid phase or in a vapour phase, either continuously or discontinuously. The unreacted products can furthermore be recycled to a subsequent operation. When the process is carried out in the liquid phase, the alcohol or the ketone can act as a solvent. It is also possible to carry out the process in the presence of a third substance acting as the solvent for at least one of the reagents, and this is generally beneficial to the reaction through reducing the amount of by-products resulting from the condensation of more than two molecules of reagents. Amongst the solvents which can be used, water, aliphatic or aromatic hydrocarbons and ethers may be mentioned.

If the starting ketone contains more than one hydrogen atom in the $\alpha$-position relative to the carbonyl group, it is possible to obtain several isomeric monoalkylated derivatives. The process of the invention generally makes it possible to work at a lower temperature for a given alcohol-ketone pair than do the processes of the prior art. Apart from the economic value of this, this lowering of the temperature makes it possible to carry out the condensation with molecules of alcohols or ketones which are relatively complex and as a result of low stability at elevated temperatures. The ketones prepared according to the invention may be used as solvents in the chemical industry; they can also be converted, according to the technique described in U.S. Pat. No. 1,899,340, into active constituents of compositions for perfumery. Certain particular ketones can be used as such as the active constituent of compositions for perfumery.

The following examples illustrate the invention. AA designates the radical:

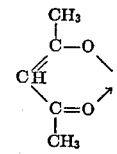

EXAMPLE 1

100 g. of benzyl alcohol, 200 g. of acetone, 100 g. of distilled water, 3 g. of sodium hydroxide and 0.500 g. of (AA)$_3$Ru are introduced into a 1000 cm.$^3$ stainless steel autoclave. The mixture is heated to 120° C. for 1 hour 30 minutes with stirring under autogenous pressure. After cooling, the mixture is neutralised with hydrochloric acid and extracted with diethyl ether, and the ethereal extract is washed with a half-saturated sodium chloride solution and dried over anhydrous sodium sulphate. The extract is then concentrated, and 113.9 g. of benzylacetone of formula $C_6H_5$—$CH_2$—$CH_2$—CO—$CH_3$ are distilled, representing a yield of 83.1% relative to the alcohol introduced, for a degree of conversion of 100%.

EXAMPLES 2 TO 15

A series of experiments is carried out, condensing a ketone and an alcohol in the presence of ruthenium (III) acetylacetonate in a 125 cm.³ stainless steel autoclave.

The various reagents, the catalyst, the alkaline agent and, where appropriate, the solvent are introduced into the autoclave. The mixture is heated with stirring under autogenous pressure, cooled, acidified with concentrated HCl, and extracted with diethyl ether. The extract is dried over anhydrous sodium sulphate, concentrated and distilled. The results obtained and the reaction conditions are given in the table below.

When the ketone obtained is subjected to the action of HBr it is converted into 4-(p-hydroxyphenyl)-butanone-2, which has a raspberry flavour.

EXAMPLE 17

10 g. of benzyl alcohol, 20 g. of acetone, 0.18 g. of sodium and 0.05 g. of $(AA)_3Ru$ are introduced into a 125 cm.³ stainless steel autoclave. The mixture is heated with stirring under autogenous pressure, for 2 hours at 120° C. The procedure of Example 2 is then followed. Benzylacetone is obtained with a degree of conversion of 95.2% and a yield of 71.2% based on the alcohol converted.

EXAMPLES 18 TO 23

A series of experiments on the condensation of benzyl alcohol and acetone in the presence of $(AA)_3Ru$ is car-

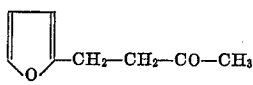

| Ex. | Alcohol | Ketone | Solvent in cm.³ | Alkaline agent in g. | Amount of catalyst in g. | Duration of heating in hrs. | Temperature during heating in °C. | Ketone obtained |
|---|---|---|---|---|---|---|---|---|
| 2 | $C_6H_5CH_2OH$, 10 grams. | $C_6H_5COCH_3$, 18 grams. | Water, 8 | NaOH, 0.6 | 0.1 | 2 | 145 | 9 g. of dihydrochalcone— $C_6H_5$—$CH_2$—$CH_2$—CO—$C_6H_5$ |
| 3 | do | $C_2H_5COCH_3$, 10 grams. | Water, 10 | Same | 0.1 | 6 | 120 | 4.2 g. of 1-phenylpentanone-3. |
| 4 | Furfuryl alcohol, 10 grams. | $CH_3COCH_3$, 10 cm.³ | Water, 8 | Aqueous sodium hydroxide solution, 36° Baumé, 2. | 0.1 | 2 | 120 | 6.7 g. of furfurylacetone— |
| 5 | $C_6H_5CH_2OH$, 10 grams. | $CH_3COCH_3$, 20 cm.³ | Nil | NaOH, 0.3 | 0.5 | 2 | 120 | 11.7 g. of benzylacetone. |
| 6 | do | Same | Benzene, 10 | Same | 0.05 | 2 | 120 | 11 g. of benzylacetone. |
| 7 | do | $CH_3COCH_3$, 10 cm.³ | Water, 1 | KOH, 0. | 0.05 | 2 | 120 | 12 g. of benzylacetone. |
| 8 | 3,7-dimethyloctanol-1, 10 grams. | Same | Water, 8 | NaOH, 0.6 | 0.1 | 16 | 160 | 2 g. of 6,10-dimethylundecanone-2. |
| 9 | $C_6H_5CH_2$—$CH_2OH$, 10 grams. | do | Water, 10 | Same | 0.1 | 24 | 145 | 3.5 g. of $C_6H_5$—$(CH_2)_3$—CO—$CH_3$. |
| 10 | $C_6H_5CH_2OH$, 10 grams. | Cyclohexanone, 18 grams. | Water, 5 | NaOH, 0.3 | 0.05 | 2 | 145 | 3.7 g. of 2-benzyl-cyclohexanone. |
| 11 | $C_2H_5OH$, 12 cm.³ | $CH_3COCH_3$, 60 cm.³ | Water, 8 | NaOH, 0.6 | 0.1 | 16 | 160 | 0.8 g. of pentanone-2. |
| 12 | $C_6H_5CH_2OH$, 10 grams. | $CH_3COCH_3$, 10 grams. | Water, 0 | $C_2H_5ONa$, 0.51. | 0.05 | 3 | 120 | 9.7 g. of benzylacetone. |
| 13 | do | $CH_3COCH_3$, 20 grams. | Water, 20 | CaO, 0.42 | 0.05 | 16 | 120 | 4.1 g. of benzylacetone. |
| 14 | do | do | Water, 10 | $LiOH \cdot H_2O$, 0.31. | 0.1 | 16 | 120 | 11.5 g. of benzylacetone. |
| 15 | do | do | Water, 20 | Piperidine, 1.27. | 0.1 | 20 | 145 | 4.3 g. of benzylacetone. |

EXAMPLE 16

350 g. of anisyl alcohol (p-$CH_3O$—$C_6H_4$—$CH_2OH$), 700 cm.³ of acetone, 262 cm.³ of distilled water, 1.75 g. of ruthenium (III) acetylacetonate and 10.5 g. of sodium hydroxide are introduced into a 1500 cm.³ stainless steel autoclave. The mixture is heated to 120° C. for 2 hours with stirring under autogenous pressure. The excess acetone is removed by distilling under a partial vacuum (30 mm. Hg). The mixture is neutralised with hydrochloric acid.

A second strictly identical operation is carried out, and the reaction mixtures from these two operations are combined and treated together as follows. They are extracted with diethyl ether. The ether solution is dried over anhydrous sodium sulphate, concentrated, and 645 g. of 4-(p-methoxyphenyl)-butanone-2 are then distilled, representing a yield of 71.4% relative to the alcohol introduced, for a degree of conversion of 100%.

ried out in a 125 cm.³ autoclave. 10 g. of benzyl alcohol, 20 g. of acetone, 0.05 g. of $(AA)_3Ru$, a solution of an alkaline agent in a solvent, and water where appropriate are introduced in the autoclave. The mixture is heated to 120° C. under autogenous pressure, cooled, and the benzylacetone isolated as in Example 2. The results obtained as well as the reaction conditions are given in the table below:

| Example | Nature of the alkaline agent | Nature of the solvent | Concentration of the alkaline agent in the solvent, percent | Amount of solution employed | Water, cm.³ | Heating time, hrs. | Degree of conversion, percent | Yield based on alcohol converted, percent |
|---|---|---|---|---|---|---|---|---|
| 18 | Triethylhexadecylammonium hydroxide | Water | 17 | 7.65 cm.³ | 0 | 16 | 81 | 61.2 |
| 29 | Tetrabutylammonium hydroxide | do | 40 | 1 g. | 0 | 16 | 4.15 | 76 |
| 20 | Triethyloctadecylammonium hydroxide | do | 13.3 | 10.5 cm.³ | 0 | 16 | 94.5 | 81.4 |
| 1 | Tributyllaurylammonium hydroxide | do | 17.8 | 7.8 cm.³ | 0 | 16 | 100 | 76.6 |
| 22 | Tetrapentylammonium hydroxide | do | 15 | 8 cm.³ | 0 | 16 | 100 | 85 |
| 23 | Benzyltrimethylammonium hydroxide | Methanol | 40 | 1.1 g. | 10 | 17 | 65.9 | 76.8 |

EXAMPLE 24

10 g. of benzyl alcohol, 20 g. of acetophenone, 1 cm.³ of distilled water, 0.3 g. of sodium hydroxide and 0.05 g. of ruthenium (III) acetylacetonate are introduced into a 50 cm.³ flask. The mixture is heated with stirring under atmospheric pressure. When the reaction mixture reaches 130° C. refluxing starts. An aqueous fraction is allowed to distil and heating is then continued to 145° C. A very viscous suspension is produced. After 4 hours 45 minutes the mixture is cooled and 20 cm.³ of diethyl ether and 5 cm.³ of water are added. The mixture is acidified and extracted with diethyl ether, and the extract is dried over anhydrous sodium sulphate, concentrated and distilled. 10.4 g. of dihydrochalcone are obtained.

EXAMPLE 25

10 g. of benzyl alcohol, 18 g. of cyclohexanone, 1 cm.³ of distilled water, 0.3 g. of sodium hydroxide and 0.05 g. of ruthenium (III) acetylacetonate are introduced into a 50 cm.³ flask equipped with a condenser and a magnetic stirrer. The mixture is heated until it refluxes. An aqueous fraction is distilled off and the mixture is then heated under reflux (145° C.) for 6 hours 20 minutes. The mixture is cooled, acidified with concentrated HCl, and extracted with four portions of 30 cm.³ of diethyl ether. The extract is dried over anhydrous sodium sulphate, concentrated and distilled. 6.1 g. of 2-benzyl-cyclohexanone are obtained.

EXAMPLE 26

50 g. of geraniol, 100 cm.³ of acetone, 25 cm.³ of distilled water, 1.5 g. of sodium hydroxide and 0.25 g. of ruthenium (III) acetylacetonate are introduced into a 250 cm.³ stainless steel autoclave. The mixture is heated for 2 hours at 120° C. with stirring under autogenous pressure, neutralised with concentrated HCl and extracted with diethyl ether. The extract is dried over sodium sulphate, concentrated and distilled. 32.6 g. of geranylacetone of formula:

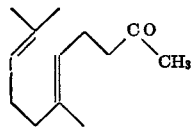

are obtained.

EXAMPLE 27

10 g. of benzyl alcohol, 16 g. of acetone, 10 g. of distilled water, 0.3 g. of sodium hydroxide and 0.09 g. of $(AA)_2Ru(CO)_2$ are introduced into a 125 cm.³ stainless steel autoclave. The mixture is heated for 3 hours at 120° C. After carrying out a treatment as in Example 2, benzylacetone is obtained with a degree of conversion of 100% and a yield of 93.8%.

EXAMPLE 28

10 g. of benzyl alcohol, 10 cm.³ of acetone, 10 cm.³ of distilled water, 0.3 g. of sodium hydroxide and 0.096 g. of $(AA)_2Ru(CH_3CN)_2$ are introduced into a 125 cm.³ stainless steel autoclave. The mixture is heated for two hous at 120° C. with stirring under autogenous pressure. After carrying out the treatment as in Example 2, 8.9 g. of a mixture containing principally benzylacetone are obtained.

EXAMPLE 29

The procedure of Example 28 is followed, replacing the catalyst by 0.202 g. of $RhCl[P(C_6H_5)_3]_3$ and heating for 7 hours 30 minutes at 160° C. 4.3 g. of benzylacetone are obtained.

EXAMPLE 30

The procedure of Example 28 is followed, replacing the catalyst by 0.094 g. of $RuCl_3[CH_3-CH_2-CN]_3$ and heating for 8 hours at 160° C. 0.4 g. of benzylacetone are obtained.

EXAMPLE 31

The procedure of Example 28 is followed, replacing the catalyst by 0.240 g. of ruthenium (III) stearate and heating for 16 hours at 160° C. 1 g. of benzylacetone is obtained.

The ruthenium stearate used was prepared by reaction of ruthenium trichloride with sodium stearate.

EXAMPLE 32

The procedure of Example 31 is followed, replacing the catalyst by 0.051 g. of $RuCl_3$ and employing 0.7 g. of sodium hydroxide. 0.8 g. of benzylacetone are obtained.

EXAMPLE 33

0.4 g. of sodium hydroxide, 10 g. of benzyl alcohol, 20 g. of acetone, 10 cm.³ of water and 0.1 g. of osmium trichloride trihydrate are introduced into a 125 cm.³ stainless steel autoclave. The mixture is heated for 16 hours at 145° C. with stirring under autogenous pressure, and is worked up as described above. 0.8 g. of benzylacetone are obtained.

EXAMPLE 34

10 g. of benzyl alcohol, 10 cm.³ of acetone, 10 cm.³ of water, 0.6 g. of sodium hydroxide and 0.102 g. of $$(AA)_2Pd$$

are introduced into a 125 cm.³ stainless steel autoclave. The mixture is heated for 16 hours 15 minutes at 160° C. under autogenous pressure and worked up as described above. 2 g. of benzylacetone are obtained.

EXAMPLE 35

10 g. of benzyl alcohol, 20 cm.³ of acetone, 5 cm.³ of distilled water, 0.3 g. of sodium hydroxide and 0.2 g. of $IrCl(CO)[P(C_6H_5)_3]_2$ are introduced into a 125 cm.³ stainless steel autoclave. The mixture is heated for 2 hours at 120° C. with stirring under autogenous pressure, cooled, acidified and extracted with diethyl ether. The extract is dried over anhydrous sodium sulphate, concentrated and distilled. 1.5 g. of benzylacetone are obtained.

EXAMPLE 36

10 g. of benzyl alcohol, 10 g. of methyl isopropyl ketone, 10 cm.³ of water, 0.1 g. of $(AA)_3Ru$ and 0.3 g. of sodium hydroxide are introduced into a 125 cm.³ stainless steel autoclave. The mixture is heated for 16 hours at 145° C. with stirring under autogenous pressure. 1.28 g. of 1-phenyl-4-methyl-pentanone-3 are obtained.

EXAMPLE 37

10 g. of furfuryl alcohol, 20 g. of cyclohexanone, 10 cm.³ of water, 0.101 g. of $(AA)_3Ru$ and 0.3 g. of sodium hydroxide are introduced into a 125 cm.³ stainless steel autoclave. The mixture is heated for 8 hours at 145° C. with stirring under autogenous pressure. The procedure of Example 2 is then followed. 2-furfuryl-cyclohexanone of formula

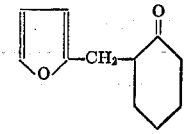

is obtained with a degree of conversion of 75.4% and a yield of 29% based on the alcohol introduced.

We claim:
1. Process for the preparation of a ketone of the formula:

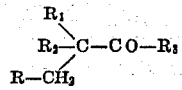

in which R represents a monovalent aromatic hydrocarbon group, a methoxy substituted monovalent aromatic hydrocarbon group, or a furyl group or an aliphatic, cycloaliphatic or araliphatic hydrocarbon group having a carbon to carbon double bond in the $\alpha\beta$ position, $R_1$, $R_2$ and $R_3$, which may be the same or different, each represent a straight or branched chain saturated or unsaturated monovalent hydrocarbon group or in which two of the three radicals $R_1$, $R_2$ and $R_3$ may be combined together to form a divalent straight or branched chain saturated or unsaturated hydrocarbon radical or in which at least one of $R_1$ and $R_2$ can be hydrocarbon which comprises reacting at a temperature of 50° to 200° C. a primary alcohol of the formula R—CH$_2$OH with a ketone of formula $R_1R_2$CH—CO—$R_3$ in the presence of a basic compound comprising an oxide, hydroxide or alcoholate of an alkali metal or calcium; or a quaternary ammonium hydroxide or a primary, secondary or tertiary amine and in the presence of a catalyst comprising ruthenium or derivative thereof.

2. Process according to claim 1, in which $R_1$, $R_2$ and $R_3$ are each alkyl of up to 5 carbon atoms, or phenyl, and $R_1$ and $R_2$ can also be hydrogen, and $R_1$ and $R_3$ together can make up a trimethylene or tetramethylene chain.

3. Process according to claim 1, in which the catalyst is a halide, carboxylic acid salt or complex of ruthenium with an electron donor selected from 1,3-diketones, carbon monoxide, nitriles, amines, phosphines and olefins.

4. Process according to claim 1, in which the catalyst is ruthenium acetylacetonate.

5. Process according to claim 1, in which the base is sodium hydroxide.

6. Process according to claim 1, in which the reaction is effected in the presence of water.

7. Process according to claim 1, in which the proportion of the basic compound is 5 to 20% by weight of the alcohol R—CH$_2$OH initially used.

8. Process according to claim 1, in which the proportion of the catalyst (expressed as metal) is 0.01 to 5% of the weight of the alcohol R—CH$_2$OH initially used.

9. Process according to claim 1, in which the reaction is effected under atmospheric pressure or in a sealed vessel under autogenous pressure.

10. Process according to claim 1 in which R is phenyl or furyl.

11. Process according to claim 1 wherein the alcohol R—CH$_2$OH is benzyl alcohol, anisyl alcohol or geraniol.

References Cited

UNITED STATES PATENTS

| | | | |
|---|---|---|---|
| 2,064,254 | 12/1936 | Fuchs et al. | 260—593 R |
| 2,697,730 | 12/1954 | Mecorney et al. | 260—596 |
| 3,479,403 | 11/1969 | McLean | 260—596 |
| 3,047,630 | 7/1962 | Addy | 260—596 |

OTHER REFERENCES

Ipatieff et al., J. of Organic Chem. (1942), vol. 7, pp. 189–95.

Tetenyi et al., Acta Chim. Acad. Sci. Hung. (1968), vol. 56 (2), pp. 141–52 (Chemical Abstract), vol. 69 (1968), 305 13m.

ALEX MAZEL, Primary Examiner

B. DENTZ, Assistant Examiner

U.S. Cl. X.R.

260—590, 593, 586, 587, 592, 594

UNITED STATES PATENT OFFICE
CERTIFICATE OF CORRECTION

Patent No. 3,781,307  Dated December 25, 1973.

Inventor(s) PIERRE CHABARDES et al

It is certified that error appears in the above-identified patent and that said Letters Patent are hereby corrected as shown below:

IN THE HEADING:

Change the priority date from "August 12, 1969" to

-- August 12, 1968 --.

Signed and sealed this 18th day of June 1974.

(SEAL)
Attest:

EDWARD M. FLETCHER, JR.
Attesting Officer

C. MARSHALL DANN
Commissioner of Patents